US011795335B2

(12) United States Patent
Kitou et al.

(10) Patent No.: US 11,795,335 B2
(45) Date of Patent: Oct. 24, 2023

(54) RESIN COMPOSITION FOR MODELING MATERIAL, LIGHT CURING MOLDING INK SET, AND METHOD FOR MANUFACTURING OPTICALLY SHAPED ARTICLE

(71) Applicants: MAXELL, LTD., Kyoto (JP); MIMAKI ENGINEERING CO., LTD., Nagano (JP)

(72) Inventors: Katsuyuki Kitou, Kyoto (JP); Taeko Izumo, Kyoto (JP); Masakatsu Okawa, Nagano (JP); Kenta Hongo, Nagano (JP)

(73) Assignees: MAXELL, LTD., Kyoto (JP); MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 17/701,322

(22) Filed: Mar. 22, 2022

(65) Prior Publication Data

US 2022/0213335 A1 Jul. 7, 2022

Related U.S. Application Data

(63) Continuation of application No. 15/759,807, filed as application No. PCT/JP2016/077256 on Sep. 15, 2016, now abandoned.

(30) Foreign Application Priority Data

Sep. 15, 2015 (JP) ................. 2015-181574

(51) Int. Cl.
| | |
|---|---|
| *C08F 2/46* | (2006.01) |
| *C08F 2/50* | (2006.01) |
| *C08G 61/04* | (2006.01) |
| *C09D 11/101* | (2014.01) |
| *B33Y 70/00* | (2020.01) |
| *B33Y 10/00* | (2015.01) |
| *C08F 2/44* | (2006.01) |
| *C08F 290/06* | (2006.01) |
| *C08F 283/06* | (2006.01) |
| *C08F 220/30* | (2006.01) |
| *B29C 64/112* | (2017.01) |
| *C09D 11/107* | (2014.01) |
| *C09D 11/322* | (2014.01) |
| *C09D 11/38* | (2014.01) |
| *B29C 64/40* | (2017.01) |
| *C08F 222/10* | (2006.01) |
| *B29K 105/00* | (2006.01) |

(52) U.S. Cl.
CPC .......... *C09D 11/101* (2013.01); *B29C 64/112* (2017.08); *B33Y 10/00* (2014.12); *B33Y 70/00* (2014.12); *C08F 2/44* (2013.01); *C08F 2/50* (2013.01); *C08F 220/301* (2020.02); *C08F 283/06* (2013.01); *C08F 290/067* (2013.01); *C09D 11/107* (2013.01); *C09D 11/322* (2013.01); *C09D 11/38* (2013.01); *B29C 64/40* (2017.08); *B29K 2105/0005* (2013.01); *C08F 222/102* (2020.02); *C08F 222/1025* (2020.02)

(58) Field of Classification Search
CPC .. C08F 283/06; C08F 2/50; C08F 2/44; C08F 290/067; C08F 222/1006; C08F 222/102; C08F 222/1025; C08F 222/1065; C08F 220/30; C08F 220/18; C08F 220/301; C08F 220/58; C08F 220/1809; C08F 220/1811; C09D 11/322; C09D 11/101; C09D 11/38; C09D 11/107; B33Y 10/00; B33Y 70/00; B29K 2105/005; B29C 64/112; B29C 64/40
USPC ................ 522/6, 71, 189, 184, 1; 520/1
See application file for complete search history.

(56) References Cited

U.S. PATENT DOCUMENTS

| | | |
|---|---|---|
| 8,541,072 B2 | 9/2013 | Foley et al. |
| 2004/0175451 A1 | 9/2004 | Maekawa et al. |
| 2008/0105818 A1 | 5/2008 | Cohen |
| 2013/0127963 A1 | 5/2013 | Pratt et al. |
| 2013/0234370 A1 | 9/2013 | Suzuki et al. |
| 2014/0248473 A1 | 9/2014 | Makuta |
| 2016/0115297 A1 | 4/2016 | Norikane et al. |

(Continued)

FOREIGN PATENT DOCUMENTS

| | | |
|---|---|---|
| CN | 1526542 A | 9/2004 |
| CN | 103189187 A | 7/2013 |

(Continued)

OTHER PUBLICATIONS

Suzuki et al., JP 2012111226 Machine Translation, Jun. 14, 2012 (Year: 2012).*
U.S. PTO Non-Final Office issued in related U.S. Appl. No. 15/748,082, dated Jan. 6, 2021.
Chinese Office Action issued in corresponding Chinese Patent Application No. 201680044098.8, dated Aug. 26, 2020, with English translation.

(Continued)

*Primary Examiner* — Jessica Whiteley
(74) *Attorney, Agent, or Firm* — JCIPRNET (57) ABSTRACT

There is provided a resin composition for a modeling material, used for shaping a modeling material by a manufacturing method for light curing molding using an ink-jet scheme, comprising (A) an ethylenic unsaturated monomer as a photocuring component, (B) a photopolymerization initiator, and (C) a surface adjusting agent, wherein the resin composition for a modeling material has surface tension Mt of 26.0 to 33.0 mN/m, and the resin composition for a modeling material has surface tension Mst represented by the following (i) expression of 33.0 mN/m or more, and this resin composition for a modeling material 4a can afford a light cured article having the good dimensional accuracy.

20 Claims, 3 Drawing Sheets

(56) References Cited

U.S. PATENT DOCUMENTS

| | | |
|---|---|---|
| 2017/0252971 A1 | 9/2017 | Umebayashi |
| 2017/0283631 A1 | 10/2017 | Paul et al. |
| 2018/0079923 A1 | 3/2018 | Umebayashi |
| 2018/0291219 A1 | 10/2018 | Kiyosada |
| 2019/0358892 A1 | 11/2019 | Kito et al. |
| 2019/0359841 A1 | 11/2019 | Kito et al. |
| 2020/0407581 A1 | 12/2020 | Kito et al. |

FOREIGN PATENT DOCUMENTS

| | | | |
|---|---|---|---|
| EP | 2 088 176 A1 | | 8/2009 |
| EP | 2 532 719 A2 | | 12/2012 |
| EP | 2 636 511 A1 | | 9/2013 |
| EP | 3 305 508 A1 | | 4/2018 |
| JP | H06-220148 A | | 8/1994 |
| JP | 2004-002616 A | | 1/2004 |
| JP | 2004-255839 A | | 9/2004 |
| JP | 2004-291625 A | | 10/2004 |
| JP | 2005-243219 A | | 9/2005 |
| JP | 2007-161740 A | | 6/2007 |
| JP | 2009-196274 A | | 9/2009 |
| JP | 2010-155889 A | | 7/2010 |
| JP | 2010-155926 A | | 7/2010 |
| JP | 2011-173981 A | | 9/2011 |
| JP | 2012-111226 A | | 6/2012 |
| JP | 2012111226 | * | 6/2012 |
| JP | 2013-076005 A | | 4/2013 |
| JP | 2015-010168 A | | 1/2015 |
| JP | 2015-038166 A | | 2/2015 |
| JP | 2015-078255 A | | 4/2015 |
| JP | 2015-123684 A | | 7/2015 |
| JP | 2016-117273 A | | 6/2016 |
| JP | 2016-117902 A | | 6/2016 |
| WO | 03/029365 A1 | | 4/2003 |
| WO | 2015/056614 A1 | | 4/2015 |
| WO | 2016/121587 A1 | | 8/2016 |
| WO | 2017/018453 A1 | | 2/2017 |

OTHER PUBLICATIONS

Chinese Office Action issued in corresponding Chinese Patent Application No. 201680053320.0, dated Aug. 31, 2020, with English Translation.
hinese Office Action issued in corresponding Chinese Patent Application No. 201680044098.8, dated Jun. 1, 2020, with English translation.
International Preliminary Report on Patentability issued in corresponding International Patent Application No. PCT/JP2016/077256, dated Mar. 20, 2018.
Chinese Office Action issued in corresponding Chinese Patent Application No. 201680053265.5, dated Aug. 31, 2020, with English Translation.
Extended Search Report issued in corresponding European Patent Application No. 16846563.1-1102, dated May 14, 2019.
Chinese Office Action issued in corresponding Chinese Patent Application No. 201680053320.0, dated May 8, 2019, with English Translation.
Final Office Action issued in U.S. Appl. No. 15/748,082, dated Jul. 1, 2021.
Nakamura et al, WO 2015056614 Machine Translation, Apr. 23, 2015 (Year: 2015).
Kitou et al, WO 2017018453 Machine Translation, Feb. 2, 2017 (Year: 2017).
Non-Final Rejection issued in corresponding U.S. Appl. No. 15/759,807, dated Jan. 29, 2021.
Final Rejection issued in corresponding U.S. Appl. No. 15/759,807, dated May 14, 2021.
Non-Final Rejection issued in corresponding U.S. Appl. No. 15/759,807, dated Nov. 22, 2021.
Japanese Notice of Reasons for Refusal issued in corresponding Japanese Patent Application No. 2015-149753, dated Oct. 15, 2019, with English translation.
Search Report issued in corresponding International Patent Application No. PCT/JP2016/072038, dated Oct. 4, 2016.
International Preliminary Report on Patentability received in corresponding International Patent Application No. PCT/JP2016/072038, dated Jan. 30, 2018.
Search Report issued in corresponding International Patent Application No. PCT/JP2016/077255, dated Nov. 1, 2016.
English translation of International Preliminary Report on Patentability received in corresponding International Patent Application No. PCT/JP2016/077255, dated Mar. 20, 2018.
Extended European Search Report issued in corresponding European Patent Application No. 20161752.9-1107, dated Jun. 29, 2020.
Extended European Search Report issued in corresponding European Patent Application No. 16846564.9-1107, dated Apr. 18, 2019.
Chinese Office Action issued in corresponding Chinese Patent Application No. 201680053265.5, dated May 15, 2019, with English Translation.
U.S. PTO Final Office issued in related U.S. Appl. No. 15/759,796, dated Dec. 23, 2020.
Partial Supplemental European Search Report issued in corresponding European Patent Application No. 16830558.9, dated Feb. 18, 2019.
Chinese Decision of Rejection issued in Chinese Patent Application No. 201680044098.8, dated Mar. 1, 2021, with English translation from related U.S. Appl. No. 15/748,082.
U.S. PTO Restriction Requirement issued in related U.S. Appl. No. 15/748,082, dated Jul. 29, 2020.
Extended European Search Report issued a corresponding European Patent Application No. 16830558.9-1107, dated Jun. 14, 2019.
Communication Pursuant to Article 94(3) EPC issued in corresponding European Patent Application No. 16846563.1, dated Jan. 13, 2020.

* cited by examiner

Line A-A cross-sectional view

RESIN COMPOSITION FOR MODELING MATERIAL, LIGHT CURING MOLDING INK SET, AND METHOD FOR MANUFACTURING OPTICALLY SHAPED ARTICLE

CROSS REFERENCE

This application is a continuation under 35 U.S.C. § 111(a) of Ser. No. 15/759,807, filed on Mar. 13, 2018, which in turn is the U.S. National Phase under 35 U.S.C. § 371 of International Application No. PCT/JP2016/077256, filed on Sep. 15, 2016, which claims the benefit of Japanese Application No. 2015-181574, filed on Sep. 15, 2015, the entire contents of each are hereby incorporated by reference.

TECHNICAL FIELD

The present invention relates to a resin composition for a modeling material, a light curing molding ink set comprising the resin composition for a modeling material, and a method for manufacturing a light cured article using the light curing molding ink set.

BACKGROUND ART

Conventionally, as a method for making a stereoscopically shaped product, a shaping method using a photocurable resin composition which cures by irradiating ultraviolet rays or the like has widely been known. Specifically, in such a shaping method, a cured layer having a predetermined shape is formed by irradiating the photocurable resin composition with ultraviolet rays or the like to cure it. Thereafter, a new cured layer is formed by further feeding the photocurable resin composition on the cured layer to cure it. By repeatedly performing the step as described above, a stereoscopically shaped product is made.

Among the shaping methods as described above, in recent years, there has been reported an optical shaping method by an ink-jet system by discharging the photocurable resin composition from a nozzle, irradiating ultraviolet rays or the like immediately after the discharge to cure it, thereby, forming a cured layer having a predetermined shape (hereinafter referred to as manufacturing method for light curing molding using an ink-jet scheme) (JP-A-2004-255839, JP-A-2010-155889, JP-A-2010-155926 and JP-A-2012-111226). The manufacturing method for light curing molding using an ink-jet scheme does not need installation of a large-scale resin liquid tank for storing the photocurable resin composition and a darkroom. For that reason, a shaping apparatus can be miniaturized as compared with the conventional method. The manufacturing method for light curing molding using an ink-jet scheme has been paid attention as a shaping method which is realized by a 3D printer that can freely make a stereoscopically shaped product, based on CAD (Computer Aided Design) data.

In the manufacturing method for light curing molding using an ink-jet scheme, when a light cured article having a complicated shape such as a hollow shape is shaped, in order to support a modeling material, the modeling material and a supporting material are formed in combination (JP-A-2004-255839, JP-A-2010-155889 and JP-A-2012-111226). The supporting material is made by irradiating the photocurable resin composition with ultraviolet rays or the like to cure it, like the modeling material. After the modeling material has been made, the supporting material can be removed by physically peeling the supporting material, or dissolving the supporting material in an organic solvent or water.

In the manufacturing method for light curing molding using an ink-jet scheme using the modeling material and the supporting material, the cured layer is formed, for example, by the following method. First, by discharging a resin composition for a modeling material and a resin composition for a supporting material from an ink-jet head, a resin composition layer in which a layer composed of the resin composition for a modeling material and the resin composition for a supporting material are contiguous is formed. And, in order to smooth an upper surface of the resin composition layer, a roller is used to remove the extra resin composition for a modeling material and resin composition for a supporting material. Finally, by irradiating these resin compositions with light using a light source, the resin compositions are cured. Thereby, a cured layer composed of the modeling material and the supporting material is formed.

SUMMARY OF THE INVENTION

Problems to be Solved by the Invention

However, the conventional light cured article which is obtained by using the resin composition for a modeling material and the resin composition for a supporting material had a problem that the dimensional accuracy is reduced.

The present invention was made in view of the above-mentioned present situation, and an object thereof is to provide a resin composition for a modeling material by which a light cured article having the good dimensional accuracy can be obtained, a light curing molding ink set comprising the resin composition for a modeling material, and a method for manufacturing a light cured article using the light curing molding ink set.

Solutions to the Problems

The present inventors intensively studied the cause for reduction in the dimensional accuracy of the light cured article. As a result, the present inventors obtained the finding that in the light cured article having the reduced dimensional accuracy, by movement of one of the resin composition for a modeling material and the resin composition for a supporting material to the other side at an interface between the layer composed of the resin composition for a modeling material and the layer composed of the resin composition for a supporting material, blur (bleeding) is generated at the interface. That is, the present inventors obtained the finding that bleeding which is generated at the interface between the layer composed of the resin composition for a modeling material and the layer composed of the resin composition for a supporting material is one of the causes for reduction in the dimensional accuracy of the light cured article.

The present invention was made based on the above-mentioned finding, and the gist thereof is as follows:

[1] A resin composition for a modeling material, used for shaping a modeling material by a manufacturing method for light curing molding using an ink-jet scheme, comprising (A) an ethylenic unsaturated monomer as a photocuring component, (B) a photopolymerization initiator, and (C) a surface adjusting agent, wherein the resin composition for a modeling material has surface tension $M_t$ of 26.0 to 33.0 mN/m, and the resin composition for a modeling material has surface tension $M_{st}$ represented by the following (i) expression of 33.0 mN/m or more.

[Mathematic 1]

$$Mst = \frac{\Sigma \text{ (Surface tension of each photocuring component} \times \text{content of each photocuring component)}}{\text{Total content of photocuring components}} \quad \text{(i)}$$

[Mathematic 2]

$$Mst = \frac{\Sigma \text{ (Surface tension of each photocuring component} \times \text{content of each photocuring component)}}{\text{Total content of photocuring components}} \quad \text{(i)}$$

Effects of the Invention

According to the present invention, there can be provided a resin composition for a modeling material by which a light cured article having the good dimensional accuracy can be obtained by suppressing generation of bleeding at an interface between a layer composed of a resin composition for a modeling material and a layer composed of a resin composition for a supporting material, a light curing molding ink set comprising the resin composition for a modeling material, and a method for manufacturing a light cured article using the light curing molding ink set.

EMBODIMENTS OF THE INVENTION

One embodiment of the present invention (hereinafter, also referred to as present embodiment) will be illustrated in detail below. The present invention is not limited to the following contents. In addition, in the following illustration, "(meth)acrylate" is a generic name of acrylate and methacrylate, and means one or both of acrylate and methacrylate. This also applies to "(meth)acryloyl" and "(meth)acryl".

[1] The resin composition for a modeling material of the present embodiment is a resin composition for a modeling material, used for shaping a modeling material by a manufacturing method for light curing molding using an ink-jet scheme, comprising (A) an ethylenic unsaturated monomer as a photocuring component, (B) a photopolymerization initiator, and (C) a surface adjusting agent, wherein the resin composition for a modeling material has surface tension Mt of 26.0 to 33.0 mN/m, and the resin composition for a modeling material has surface tension Mst represented by the following (i) expression of 33.0 mN/m or more.

[2] In the resin composition for a modeling material according to [1], the (A) component comprises 70 parts by weight or less of a monofunctional ethylenic unsaturated monomer, based on 100 parts by weight of the whole resin composition for a modeling material.

[3] In the resin composition for a modeling material according to [2], the content of the monofunctional ethylenic unsaturated monomer is 5 to 70 parts by weight, based on 100 parts by weight of the whole resin composition for a modeling material.

[4] In the resin composition for a modeling material according to any one of [1] to [3], the (A) component comprises 70 parts by weight or less of a polyfunctional ethylenic unsaturated monomer, based on 100 parts by weight of the whole resin composition for a modeling material.

[5] In the resin composition for a modeling material according to [4], the content of the polyfunctional ethylenic unsaturated monomer is 20 to 70 parts by weight, based on 100 parts by weight of the whole resin composition for a modeling material.

[6] In the resin composition for a modeling material according to any one of [1] to [5], the content of the (A) component is 80 to 99 parts by weight, based on 100 parts by weight of the whole resin composition for a modeling material.

[7] In the resin composition for a modeling material according to any one of [1] to [6], the resin composition for a modeling material further contains an oligomer as (D) a photocuring component.

[8] In the resin composition for a modeling material according to [7], the content of the (D) component is 10 to 45 parts by weight, based on 100 parts by weight of the whole resin composition for a modeling material.

[9] In the resin composition for a modeling material according to any one of [1] to [8], the resin composition for a modeling material has the surface tension Mst of 33.0 to 40.0 mN/m.

[10] The light curing molding ink set of the present embodiment is a light curing molding ink set used for a manufacturing method for light curing molding using an ink-jet scheme, comprising a combination of the resin composition for a modeling material as defined in any one of [1] to [9], and a resin composition for a supporting material used for shaping the supporting material, wherein the resin composition for a supporting material contains (E) a water-soluble monofunctional ethylenic unsaturated monomer, (F) polyalkylene glycol comprising an oxyethylene group and/or an oxypropylene group, (B) a photopolymerization initiator, and (C) a surface adjusting agent.

[11] In the light curing molding ink set according to [10], the content of the (E) component is 20 to 50 parts by weight, based on 100 parts by weight of the whole resin composition for a supporting material.

[12] In the light curing molding ink set according to [10] or [11], the content of the (F) component is 20 to 49 parts by weight, based on 100 parts by weight of the whole resin composition for a supporting material.

[13] In the light curing molding ink set according to any one of [10] to [12], a number average molecular weight Mn of the (F) component is 100 to 5,000.

[14] In the light curing molding ink set according to any one of [10] to [13], surface tension St of the resin composition for a supporting material is 24.0 to 33.0 mN/m.

[15] The method for manufacturing a light cured article of the present embodiment is a method for manufacturing a light cured article using the light curing molding ink set as defined in any one of [10] to [14] by a manufacturing method for light curing molding using an ink-jet scheme, comprising a step (I) of discharging a resin composition for a modeling material and a resin composition for a supporting material from an ink-jet head, so that a resin composition layer in which a layer composed of the resin composition for a modeling material and a layer composed of the resin composition for a supporting material are arranged contiguously, a step (II) of photocuring the resin composition for a modeling material and the resin composition for a supporting material constituting the resin composition layer, respectively, thereby, obtaining a modeling material and a supporting material, and a step (III) of removing the supporting material, thereby, obtaining a light cured article.

1. Resin Composition for Modeling Material

The resin composition for a modeling material contains (A) an ethylenic unsaturated monomer as a photocuring component, (B) a photopolymerization initiator, and (C) a surface adjusting agent.

<(A) Ethylenic Unsaturated Monomer>

The (A) ethylenic unsaturated monomer is a photocuring component having property that it cures by energy rays. The (A) component comprises at least one of a monofunctional ethylenic unsaturated monomer having one ethylenic double bond in a molecule, and a polyfunctional ethylenic unsaturated monomer having two or more ethylenic double bonds in a molecule.

Additionally, the monofunctional ethylenic unsaturated monomer comprises at least one of a water-insoluble monofunctional ethylenic unsaturated monomer, and a water-soluble monofunctional ethylenic unsaturated monomer.

Examples of the water-insoluble monofunctional ethylenic unsaturated monomer include, for example, linear or branched alkyl (meth)acrylates having 4 to 30 carbon atoms [e.g. methyl (meth)acrylate, ethyl (meth)acrylate, isobutyl (meth)acrylate, lauryl (meth)acrylate, stearyl (meth)acrylate, isostearyl (meth)acrylate, t-butyl (meth)acrylate etc.], alicyde-containing (meth)acrylates having 6 to 20 carbon atoms [e.g. cyclohexyl (meth)acrylate, 4-t-cyclohexyl (meth)acrylate, isobornyl (meth)acrylate, 4-t-butylcyclohexanol (meth)acrylate, 3,3,5-trimethylcyclohexanol (meth) acrylate, phenoxyethyl (meth)acrylate etc.], heterocycle-containing (meth)acrylates having 5 to 20 carbon atoms [e.g. tetrahydrofurfuryl (meth)acrylate, 4-(meth)acryloyloxymethyl-2-methyl-2-ethyl-1,3-dioxolane, 4-(meth)acryloyloxymethyl-2-cyclohexyl-1,3-dioxolane, adamantyl (meth) acrylate, cyclic trimethylolpropaneformal (meth)acrylate etc.] and the like. These may be used alone, or two or more may be used concurrently. Among them, from a view point that curability of the resin composition for a modeling material is improved, the water-insoluble monofunctional ethylenic unsaturated monomer is preferably 4-t-butylcyclohexanol (meth)acrylate, 3,3,5-trimethylcyclohexanol (meth) acrylate, or phenoxyethyl (meth)acrylate.

Examples of the water-soluble monofunctional ethylenic unsaturated monomer include, for example, hydoxy group-containing (meth)acrylates having 5 to 15 carbon atoms [e.g. hydroxyethyl (meth)acrylate, hydroxypropyl (meth)acrylate, 4-hydroxybutyl (meth)acrylate etc.], hydroxy group-containing (meth)acrylates having Mn of 200 to 1,000 [polyethylene glycol mono(meth)acrylate, monoalkoxy (having 1 to 4 carbon atoms) polyethylene glycol mono (meth)acrylate, polypropylene glycol mono(meth)acrylate, monoalkoxy (having 1 to 4 carbon atoms) polypropylene glycol mono(meth)acrylate, mono(meth)acrylate of PEG-PPG block polymer etc.], (meth)acrylamide derivatives having 3 to 15 carbon atoms [(meth)acrylamide, N-methyl (meth)acrylamide, N-ethyl(meth)acrylamide, N-propyl (meth)acrylamide, N-butyl(meth)acrylamide, N,N'-dimethyl (meth)acrylamide, N,N'-diethyl(meth)acrylamide, N-hydroxyethyl(meth)acrylamide, N-hydroxypropyl(meth) acrylamide, N-hydroxybutyl(meth)acrylamide etc.], (meth) acryloylmorpholine and the like. These may be used alone, or two or more may be used concurrently. Among them, from a view point of improvement in curability of the resin composition for a supporting material and a view point of skin low irritation to a human body, the water-soluble monofunctional ethylenic unsaturated monomer is preferably (meth)acryloylmorpholine.

From a view point that an ink is maintained at the low viscosity, the total content of the water-insoluble monofunctional ethylenic unsaturated monomer and the water-soluble monofunctional ethylenic unsaturated monomer (i.e. the content of the monofunctional ethylenic unsaturated monomer) is preferably 5 parts by weight or more, more preferably 30 parts by weight or more, and particularly preferably 50 parts by weight or more, based on 100 parts by weight of the whole resin composition for a modeling material. Additionally, the content of the monofunctional ethylenic unsaturated monomer is preferably 70 parts by weight or less, and more preferably 69 parts by weight or less, based on 100 parts by weight of the whole resin composition for a modeling material. In addition, when two or more of the monofunctional ethylenic unsaturated monomers are contained, the content is a total of the contents of respective monofunctional ethylenic unsaturated monomers.

Examples of the polyfunctional ethylenic unsaturated monomer include, for example, limier or branched alkylene glycol di(meth)acrylates or alkylene glycol tri(meth)acrylates having 10 to 25 carbon atoms [e.g. diethylene glycol di(meth)acrylate, tripropylene glycol di(meth)acrylate, 1,6-hexanediol di(meth)acrylate, neopentyl glycol di(meth)acrylate, 1,9-nonanediol di(meth)acrylate, 3-methyl-1,5-pentanediol di(meth)acrylate, 2-n-butyl-2-ethyl-1,3-propanediol di(meth)acrylate, pentaerythritol tri(meth) acrylate, modified bisphenol A di(meth)acrylate etc.], alicycle-containing di(meth)acrylates having 10 to 30 carbon atoms [e.g. dimethyloltricyclodecane di(meth)acrylate, tricyclodecanedimethanol di(meth)acrylate etc.] and the like. These may be used alone, or two or more may be used concurrently. Among them, from a view point that curability of the resin composition for a modeling material is improved, the polyfunctional ethylenic unsaturated monomer is preferably diethylene glycol di(meth)acrylate, neopentyl glycol di(meth)acrylate, or modified bisphenol A di(meth)acrylate.

From a view point that curability of the resin composition for a modeling material is improved, the content of the polyfunctional ethylenic unsaturated monomer is preferably 70 parts by weight or less, and more preferably 60 parts by weight or less, based on 100 parts by weight of the whole resin composition for a modeling material. Additionally, the content of the polyfunctional ethylenic unsaturated monomer is preferably 20 parts by weight or more, and more preferably 30 parts by weight or more, based on 100 parts by weight of the whole resin composition for a modeling material. In addition, when two or more of the polyfunctional ethylenic unsaturated monomers are contained, the content is a total of the contents of respective polyfunctional ethylenic unsaturated monomers.

From a view point that curability of the resin composition for a modeling material is improved, the content of the (A) component is preferably 80 parts by weight or more, and more preferably 90 parts by weight or more, based on 100 parts by weight of the whole resin composition for a modeling material. Additionally, the content of the (A) component is preferably 99 parts by weight or less, and more preferably 95 parts by weight or less. In addition, when two or more of the (A) components are contained, the content is a total of the contents of respective (A) components.

<Photopolymerization Initiator (B)>

The photopolymerization initiator (B) is not particularly limited, as far as it is a compound which promotes a radical reaction when light of a wavelength in an ultraviolet ray, near ultraviolet ray or visible light region is irradiated. Examples of the (B) component include, for example, benzoin compounds having 14 to 18 carbon atoms [e.g. benzoin, benzoin methyl ether, benzoin ethyl ether, benzoin propyl ether, benzoin isobutyl ether etc.], acetophenone compounds having 8 to 18 carbon atoms [e.g. acetophenone, 2,2-diethoxy-2-phenylacetophenone, 2,2-diethoxy-2-phenylacetophenone, 1,1-dichloroacetophenone, 2-hydroxy-2-methyl-phenylpropane-1-one, diethoxyacetophenone, 1-hydroxycyclohexyl phenyl ketone, 2-methyl-1-[4-(methylthio)phenyl]-2-morpholinopropane-1-one etc.], anthraquinone compounds having 14 to 19 carbon atoms [e.g. 2-ethylanthraquinone, 2-t-butylanthraquinone, 2-chloroanthraquinone, 2-amylanthraquinone etc.], thioxanthone compounds having 13 to 17 carbon atoms [e.g. 2,4-diethylthioxanthone, 2-isopropylthioxanthone, 2-chlorothioxanthone etc.], ketal compounds having 16 to 17 carbon atoms [e.g. acetophenonedimethylketal, benzyldimethylketal etc.], benzophenone compounds having 13 to 21 carbon atoms [e.g. benzophenone, 4-benzoyl-4'-methyldiphenyl sulfide, 4,4'-bismethylaminobenzophenone etc.], acylphosphine oxide compounds having 22 to 28 carbon atoms [e.g. 2,4,6-trimethylbenzoyl-diphenyl-phosphine oxide, bis-(2,6-dimethoxybenzoyl)-2,4,4-trimethylpentylphosphine oxide, bis(2,4,6-trimethylbenzoyl)-phenylphosphine oxide], a mixture of these compounds and the like. These may be used alone, or two or more may be used concurrently. Among them, from a view point of light resistance that a modeling material which is obtained by photocuring the resin composition for a modeling material is yellowed with difficulty, the (B) component is preferably 2,4,6-trimethylbenzoyl-diphenyl-phosphine oxide. Additionally, examples of an acylphosphine oxide compound which is available in the market include, for example, DAROCURE TPO manufactured by BASF company and the like.

From a view point of photopolymerizability, the content of the (B) component is preferably 1 part by weight or more, and more preferably 3 parts by weight or more, based on 100 parts by weight of the whole resin composition for a modeling material. Additionally, the content of the (B) component is preferably 15 parts by weight or less, and more preferably 13 parts by weight or less. In addition, when two or more of the (B) components are contained, the content is a total of the contents of respective (B) components.

<Surface Adjusting Agent (C)>

The surface adjusting agent (C) is a component which adjusts the surface tension of the resin composition at an appropriate range. Examples of the (C) component include, for example, a silicone-based compound and the like. Examples of the silicone-based compound include, for example, a silicone-based compound having a polydimethylsiloxane structure, and the like. Specifically, examples thereof include polyether-modified polydimethylsiloxane, polyester-modified polydimethylsiloxane, polyaralkyl-modified polydimethylsiloxane and the like. As these, BYK-300, BYK-302, BYK-306, BYK-307, BYK-310, BYK-315, BYK-320, BYK-322, BYK-323, BYK-325, BYK-330, BYK-331, BYK-333, BYK-337, BYK-344, BYK-370, BYK-375, BYK-377, BYK-UV3500, BYK-UV3510, BYK-UV3570 (forgoing are manufactured by BYK-Chemie company), TEGO-Rad2100, TEGO-Rad2200N, TEGO-Rad2250, TEGO-Rad2300, TEGO-Rad2500, TEGO-Rad2600, TEGO-Rad2700 (foregoing are manufactured by Degussa company), Granol 100, Granol 115, Granol 400, Granol 410, Granol 435, Granol 440, Granol 450, B-1484, Polyflow ATF-2, KL-600, UCR-L72, UCR-L93 (manufactured by KYOEISHA CHEMICAL Co., LTD.) and the like as expressed by trade name may be used. These may be used alone, or two or more may be used concurrently.

From a view point that the surface tension of the resin composition is adjusted at an appropriate range, the content of the (C) component is preferably 0.005 part by weight or more, and more preferably 0.01 part by weight or more, based on 100 parts by weight of the whole resin composition for a modeling material. Additionally, the content of the (C) component is preferably 3.0 parts by weight or less, and more preferably 1.5 parts by weight or less. In addition, when two or more of the (C) components are contained, the content is a total of the contents of respective (C) components.

<(D) Oligomer>

It is preferable that the resin composition for a modeling material of the present embodiment further contains (D) an oligomer. The (D) component is a photocuring component having property that it cures by energy rays. Examples of the (D) component include, for example, a urethane (meth)acrylate oligomer, an epoxy (meth)acrylate oligomer, a polyester (meth)acrylate oligomer, a polyether (meth)acrylate oligomer and the like. These may be used alone, or two or more may be used concurrently. Among them, from a view point that curability of the resin composition for a modeling material is improved, the (D) component is preferably a urethane (meth)acrylate oligomer.

From a view point that curability of the resin composition for a modeling material is improved, the content of the (D) component is preferably 10 parts by weight or more, and more preferably 15 parts by weight or more, based on 100 parts by weight of the whole resin composition for a modeling material. Additionally, the content of the (D) component is preferably 45 parts by weight or less, and more preferably 40 parts by weight or less. In addition, when two or more of the (D) components are contained, the content is a total of the contents of respective (D) components.

In addition, in the present description, the "oligomer" refers to one having a weight average molecular weight of 800 to 10,000. A weight average molecular weight means a weight average molecular weight in terms of polystyrene, which is measured by GPC (Gel Permeation Chromatography).

The resin composition for a modeling material can contain, as necessary, other additives in such a range that the effect of the present invention is not impaired. Examples of other additives include, for example, an antioxidant, a coloring agent, a pigment dispersant, a preservation stabilizer, an ultraviolet absorbing agent, a light stabilizer, a polymerization inhibitor, a chain transfer agent, a filler and the like.

As the coloring agent, for example, the previously known coloring agents such as a diarylide-based coloring agent, a condensed azo-based coloring agent, a quinacridone-based coloring agent, a vat-based coloring agent, an isoindolinone-based coloring agent, a phthalocyanine-based coloring agent, an aniline-based coloring agent, titanium oxide, nickel titanium, yellow iron oxide, red iron oxide, ultramarine, cobalt blue, chromium oxide, iron black, chrome yellow, chrome orange, molybdenum red, a cadmium-based coloring agent, carbon black and the like can be used. These may be used alone, or two or more may be used concurrently. Among them, the coloring agent is preferably, for example, carbon black, Nickel Azo which is a condensed azo-based coloring agent, Quinacridone which is a quinacridone-based coloring agent, copper phthalocyanine which is a phthalocyanine-based coloring agent, titanium oxide or the like. The content of the coloring agent is preferably 0.01 part by weight or more, and more preferably 0.1 part by weight or more, based on 100 parts by weight of the whole resin composition for a modeling material. Additionally, the content of the coloring agent is preferably 5.0 parts by weight or less, and more preferably 3.0 parts by weight or less.

When a pigment is used as the coloring agent, the pigment dispersant may be contained in order to improve dispersibility of the pigment. Examples of the pigment dispersant include, for example, an ionic or nonionic surfactant, an anionic, cationic or nonionic polymer compound and the like. These may be used alone, or two more may be used concurrently. Among them, from respect of dispersion stability, the pigment dispersant is preferably a polymer compound comprising a cationic group or an anionic group. Examples of the pigment dispersant which is available in the market include Solsperse manufactured by Avecia company, DISPERBYK manufactured by BYK-Chemie company, EFKA manufactured by EFKA ADDITIVES B.V., and the like. The content of the pigment dispersant is preferably 0.05 part by weight or more, based on 100 parts by weight of the whole resin composition for a modeling material. Additionally, the content of the pigment dispersant is preferably 5 parts by weight or less.

The preservation stabilizer may be contained in order to enhance preservation stability of the resin composition. Examples of the preservation stabilizer include, for example, a hindered amine-based compound (HALS), a phenol-based antioxidant, a phosphorus-based antioxidant and the like. Examples of the preservation stabilizer include specifically hydroquinone, methoquinone, benzoquinone, p-methoxyphenol, hydroquinone monomethyl ether, hydroquinone monobutyl ether, TEMPO, 4-hydroxy-TEMPO, TEMPOL, Cupherron AI, IRGASTAB UV-10, IRGASTAB UV-22, FIRSTCURE ST-1 (manufactured by ALBEMARLE company), t-butylcatechol, pyrogallol, TINUVIN 111 FDL, TINUVIN 144, TINUVIN 292, TINUVIN XP40, TINUVIN XP60, TINUVIN 400 manufactured by BASF company, and the like. These may be used alone, or two or more may be used concurrently.

The resin composition for a modeling material can be manufactured, for example, by uniformly mixing the (A) to (C) components, and as necessary (D) oligomer and other additives using a mixing and stirring device or the like, without particular limitation.

The thus manufactured resin composition for a modeling material has preferably the viscosity at 25° C. of 70 mPa·s or less, from a view point that dischargeability from an ink-jet head is improved. In addition, measurement of the viscosity of the resin composition for a modeling material is performed using a R100-type viscometer in accordance with JIS Z 8803.

Additionally, the resin composition for a modeling material has the surface tension Mt of 26.0 to 33.0 mN/m, from a view point that dischargeability from an ink-jet head is improved. In addition, in the present description, the surface tension refers to a value of the surface tension after 20 seconds from measurement initiation at 25° C. Measurement of the surface tension is performed, for example, using Full Automatic Equilibrium Electro Surface Tension Meter ESB-V (manufactured by Kyowa Interface Science Co., Ltd.).

Furthermore, the resin composition for a modeling material has surface tension (also referred to as equivalence surface tension) Mst represented by the (i) expression, of 33.0 mN/m or more. When the surface tension Mst is 33.0 mN/m or more, generation of bleeding at an interface between the layer composed of the resin composition for a modeling material and the layer composed of the resin composition for a supporting material can be suppressed. That is, by movement of the resin composition for a modeling material to a side of the resin composition for a supporting material, or by movement of the resin composition for a supporting material to a side of the resin composition for a modeling material, phenomenon of generation of blur becomes difficult to be generated. As a result, a light cured article having the good dimensional accuracy can be obtained using a light curing molding ink set comprising a combination of such resin composition for a modeling material and resin composition for a supporting material. Additionally, the surface tension Mst is preferably 40.0 mN/m or less, and more preferably 39.0 mN/m or less.

In addition, the photocuring component in the expression is a component having property that it cures by energy rays. In the resin composition for a modeling material of the present embodiment, the (A) ethylenic unsaturated monomer, and the (D) oligomer which is an optional component are the photocuring component. The resin composition for a modeling material of the present embodiment may comprise other photocuring components.

2. Resin Composition for Supporting Material

It is preferable that the resin composition for a supporting material contains a water-soluble monofunctional ethylenic unsaturated monomer (E), polyalkylene glycol comprising an oxyethylene group and/or an oxypropylene group (F), a photopolymerization initiator (B), and a surface adjusting agent (C).

<(E) Water-Soluble Monofunctional Ethylenic Unsaturated Monomer>

As the (E) water-soluble monofunctional ethylenic unsaturated monomer, the same components as those of the resin composition for a modeling material can be used.

From a view point that curability of the resin composition for a supporting material is improved, and a supporting material which is obtained by photocuring the resin composition for a supporting material is rapidly dissolved in water, the content of the (E) component is preferably 20 parts by weight or more, and more preferably 25 parts by weight or more, based on 100 parts by weight of the whole resin composition for a supporting material. Additionally, the content of the (E) component is preferably 50 parts by weight or less, and more preferably 45 parts by weight or less. In addition, when two or more of the (E) components are contained, the content is a total of the contents of respective (E) components.

<Polyalkylene Glycol Comprising Oxyethylene Group and/or Oxypropylene Group (F)>

The polyalkylene glycol comprising an oxyethylene group and/or an oxypropylene group (F) is such that at least ethylene oxide and/or propylene oxide are (is) added to an active hydrogen compound. Examples of the (F) component include, for example, polyethylene glycol, polypropylene glycol and the like. These may be used alone, or two or more may be used concurrently. Examples of the active hydrogen compound include monohydric to tetrahydric alcohols, amine compounds and the like. Among them, the active hydrogen compound is preferably a dihydric alcohol or water.

From a view point that solubility in water of a supporting material which is obtained by photocuring the resin composition for a supporting material is enhanced, the content of the (F) component is preferably 20 parts by weight or more, and more preferably 25 parts by weight or more, based on 100 parts by weight of the whole resin composition for a supporting material. Additionally, the content of the (F) component is preferably 49 parts by weight or less, and more preferably 45 parts by weight or less. In addition, when two or more of the (F) components are contained, the content is a total of the contents of respective (F) components.

A number average molecular weight Mn of the (F) component is preferably 100 to 5,000. When Mn of the (F) component is in the range, the resin composition is compatible with the (F) component before photocuring, and is not compatible with the (F) component after photocuring. As a result, self-standing of a supporting material which is obtained by photocuring the resin composition for a supporting material can be enhanced, and solubility of the supporting material in water can be enhanced. Mn of the (F) component is more preferably 200 to 3,000, and further preferably 400 to 2,000.

<Photopolymerization Initiator (B)>
<Surface Adjusting Agent (C)>

As the photopolymerization initiator (B) and the surface adjusting agent (C), the same components as those of the resin composition for a modeling material can be used at the same contents.

The resin composition for a supporting material can contain other additives, as necessary, in such a range that the effect of the present invention is not impaired. Examples of other additives include, for example, a water-soluble organic solvent, an antioxidant, a coloring agent, a pigment dispersant, a preservation stabilizer, an ultraviolet absorbing agent, a light stabilizer, a polymerization inhibitor, a chain transfer agent, a filler and the like.

Examples of the water-soluble organic solvent include, for example, ethylene glycol monoacetate, propylene glycol monoacetate, diethylene glycol monoacetate, dipropylene glycol monoacetate, triethylene glycol monoacetate, tripropylene glycol monoacetate, tetraethylene glycol monoacetate, tetrapropylene glycol monoacetate, ethylene glycol monomethyl ether, propylene glycol monomethyl ether, diethylene glycol monomethyl ether, dipropylene glycol monomethyl ether, triethylene glycol monomethyl ether, tripropylene glycol monomethyl ether, tetraethylene glycol monomethyl ether, tetrapropylene glycol monomethyl ether, ethylene glycol monoethyl ether, propylene glycol monoethyl ether, diethylene glycol monoethyl ether, dipropylene glycol monoethyl ether, triethylene glycol monoethyl ether, tripropylene glycol monoethyl ether, tetraethylene glycol monoethyl ether, tetrapropylene glycol monoethyl ether, ethylene glycol monopropyl ether, propylene glycol monopropyl ether, diethylene glycol monopropyl ether, dipropylene glycol monopropyl ether, triethylene glycol monopropyl ether, tripropylene glycol monopropyl ether, tetraethylene glycol monopropyl ether, tetraethylene glycol monopropyl ether, ethylene glycol monobutyl ether, propylene glycol monobutyl ether, diethylene glycol monobutyl ether, dipropylene glycol monobutyl ether, triethylene glycol monobutyl ether, tripropylene glycol monobutyl ether, tetraethylene glycol monobutyl ether, tetrapropylene glycol monobutyl ether, ethylene glycol diacetate, propylene glycol diacetate, diethylene glycol diacetate, dipropylene glycol diacetate, triethylene glycol diacetate, tripropylene glycol diacetate, tetraethylene glycol diacetate, tetrapropylene glycol diacetate, ethylene glycol dimethyl ether, propylene glycol dimethyl ether, diethylene glycol dimethyl ether, dipropylene glycol dimethyl ether, triethylene glycol dimethyl ether, tripropylene glycol dimethyl ether, tetraethylene glycol dimethyl ether, tetrapropylene glycol dimethyl ether, ethylene glycol diethyl ether, propylene glycol diethyl ether, diethylene glycol diethyl ether, dipropylene glycol diethyl ether, triethylene glycol diethyl ether, tripropylene glycol diethyl ether, tetraethylene glycol diethyl ether, tetrapropylene glycol diethyl ether, ethylene glycol dipropyl ether, propylene glycol dipropyl ether, diethylene glycol dipropyl ether, dipropylene glycol dipropyl ether, triethylene glycol dipropyl ether, tripropylene glycol dipropyl ether, tetraethylene glycol dipropyl ether, tetrapropylene glycol dipropyl ether, ethylene glycol dibutyl ether, propylene glycol dibutyl ether, diethylene glycol dibutyl ether, dipropylene glycol dibutyl ether, triethylene glycol dibutyl ether, tripropylene glycol dibutyl ether, tetraethylene glycol dibutyl ether, tetrapropylene glycol dibutyl ether, ethylene glycol monomethyl ether acetate, propylene glycol monomethyl ether acetate, diethylene glycol monomethyl ether acetate, dipropylene glycol monomethyl ether acetate, triethylene glycol monomethyl ether acetate, tripropylene glycol monomethyl ether acetate, tetraethylene glycol monomethyl ether acetate, tetrapropylene glycol monomethyl ether acetate, ethylene glycol monoethyl ether acetate, propylene glycol monoethyl ether acetate, diethylene glycol monoethyl ether acetate, dipropylene glycol monoethyl ether acetate, triethylene glycol monoethyl ether acetate, tripropylene glycol monoethyl ether acetate, tetraethylene glycol monoethyl ether acetate, tetrapropylene glycol monoethyl ether acetate, ethylene glycol monopropyl ether acetate, propylene glycol monopropyl ether acetate, diethylene glycol monopropyl ether acetate, dipropylene glycol monopropyl ether acetate, triethylene glycol monopropyl ether acetate, tripropylene glycol monopropyl ether acetate, tetraethylene glycol monopropyl ether acetate, tetrapropylene glycol monopropyl ether acetate, ethylene glycol monobutyl ether acetate, propylene glycol monobutyl ether acetate, diethylene glycol monobutyl ether acetate, dipropylene glycol monobutyl ether acetate, triethylene glycol monobutyl ether acetate, tripropylene glycol monobutyl ether acetate, tetraethylene glycol monobutyl ether acetate, tetrapropylene glycol monobutyl ether acetate and the like. These may be used alone, or two or more may be used concurrently. From a view point that solubility of the supporting material in water is improved, and the resin composition for a supporting material is adjusted at the low viscosity, among them, the water-soluble organic solvent is more preferably triethylene glycol monomethyl ether, or dipropylene glycol monomethyl ether acetate.

From a view point that solubility of the supporting material in water is improved, and the resin composition for a supporting material is adjusted at the low viscosity, the content of the water-soluble organic solvent is preferably 5 parts by weight or more, and more preferably 10 parts by weight or more, based on 100 parts by weight of the whole resin composition for a supporting material. Additionally, the content of the water-soluble organic solvent is preferably 35 parts by weight or less, and more preferably 30 parts by weight or less. In addition, when two or more of the water-soluble organic solvents are contained, the content is a total of the contents of respective water-soluble organic solvents.

As the coloring agent, the pigment dispersant, and the preservation stabilizer, the same components as those of the resin-composition for a modeling material can be used at the same contents.

A method for manufacturing the resin composition for a supporting material is not particularly limited. The resin composition for a supporting material can be manufactured, for example, by uniformly mixing the (B), (C), (E), and (F) components, and as necessary, other additives using a mixing and stirring device or the like.

From a view point that dischargeability from an ink-jet head is improved, the thus manufactured resin composition for a supporting material has preferably the viscosity at 25° C. of 70 mPa·s or less. In addition, measurement of the viscosity of the resin composition for a supporting material is performed using a R100-type viscometer in accordance with JIS Z 8803.

Additionally, from a view point that dischargeability from an ink-jet head is improved, the resin composition for a supporting material has preferably the surface tension of 24.0 to 33.0 mN/m. In addition, in the present description, the surface tension refers to a value of the surface tension after 20 seconds from measurement initiation at 25° C. Measurement of the surface tension is performed, for example, using Full Automatic Equilibrium Electro Surface Tension Meter ESB-V (manufactured by Kyowa Interface Science Co., Ltd.).

3. Optically Shaped Article And Manufacturing Method Thereof

The light cured article is manufactured using the resin composition for a modeling material and the light curing molding ink set comprising the resin composition for a modeling material, of the present embodiment by a manufacturing method for light curing molding using an ink-jet scheme. Specifically, the light cured article is manufactured by passing through a step (I) of discharging a resin composition for a modeling material and a resin composition for a supporting material from an ink-jet head so that a resin composition layer in which a layer composed of the resin composition for a modeling material and a layer composed of the resin composition for a supporting material are arranged contiguously is formed, a step (II) of photocuring the resin composition for a modeling material and the resin composition for a supporting material constituting the resin composition layer, respectively, thereby, obtaining a modeling material and a supporting material, and a step (III) of removing the supporting material, thereby, obtaining a light cured article. The steps (I) to (III) are not particularly limited, but are performed, for example, by the following method.

<Step (I)>

Figure 1:
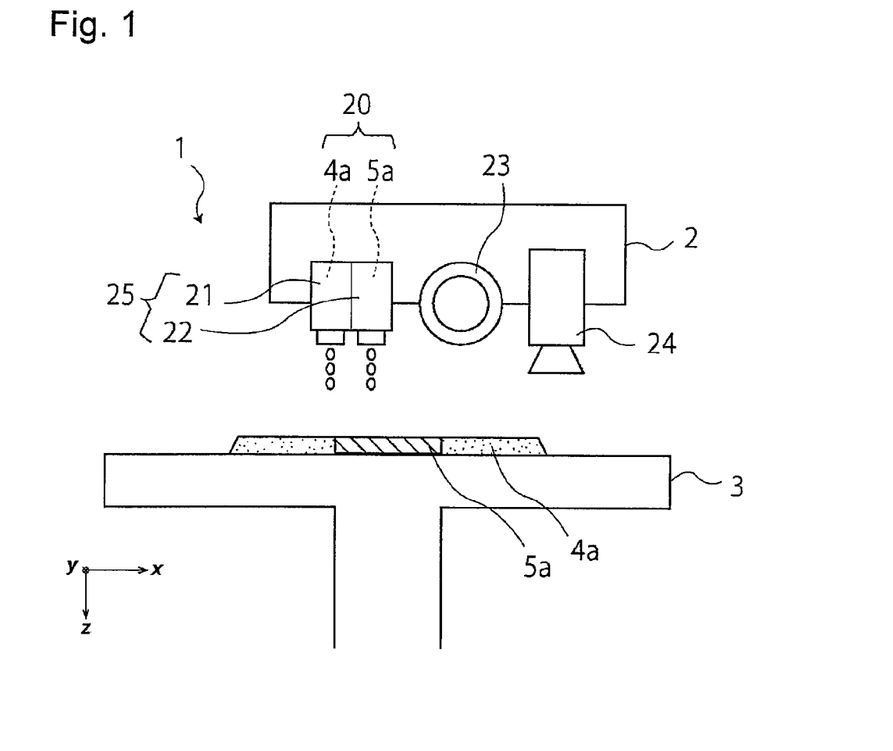
FIG. 1 is a view schematically showing a step (I) in the method for manufacturing a light cured article of the present embodiment.

FIG. 1 is a view schematically showing a step (I) in the method for manufacturing a light cured article of the present embodiment. As shown in FIG. 1, a three-dimensional shaping apparatus 1 comprises an ink-jet head module 2 and a shaping table 3. The ink-jet head module 2 has a light curing molding ink unit 25, a roller 23, and a light source 24. The light curing molding ink unit 25 has an ink-jet head 21 for a modeling material, which is filled with a resin composition 4a for a modeling material, and an ink-jet head 22 for a supporting material, which is filled with a resin composition 5a for a supporting material. In addition, the light curing molding ink set 20 of the present embodiment is constructed of a combination of the resin composition 4a for a modeling material and the resin composition 5a for a supporting material.

First, the ink-jet head module 2 is made to perform scanning in an X direction and a Y direction, and at the same time, discharge the resin composition 4a for a modeling material from the ink-jet head 21 for a modeling material, and discharge the resin composition 5a for a supporting material from the ink-jet head 22 for a supporting material, relatively to the shaping table 3 in FIG. 1. Thereby, a resin composition layer in which interfaces between a layer composed of the resin composition 4a for a modeling material and a layer composed of the resin composition 5a for a supporting material are arranged contiguously so as to come into contact with each other is formed on the shaping table 3. And, in order to smooth an upper surface of the resin composition layer, the extra resin composition 4a for a modeling material and resin composition 5a for a supporting material are removed using the roller 23.

<Step (II)>

Figure 2:
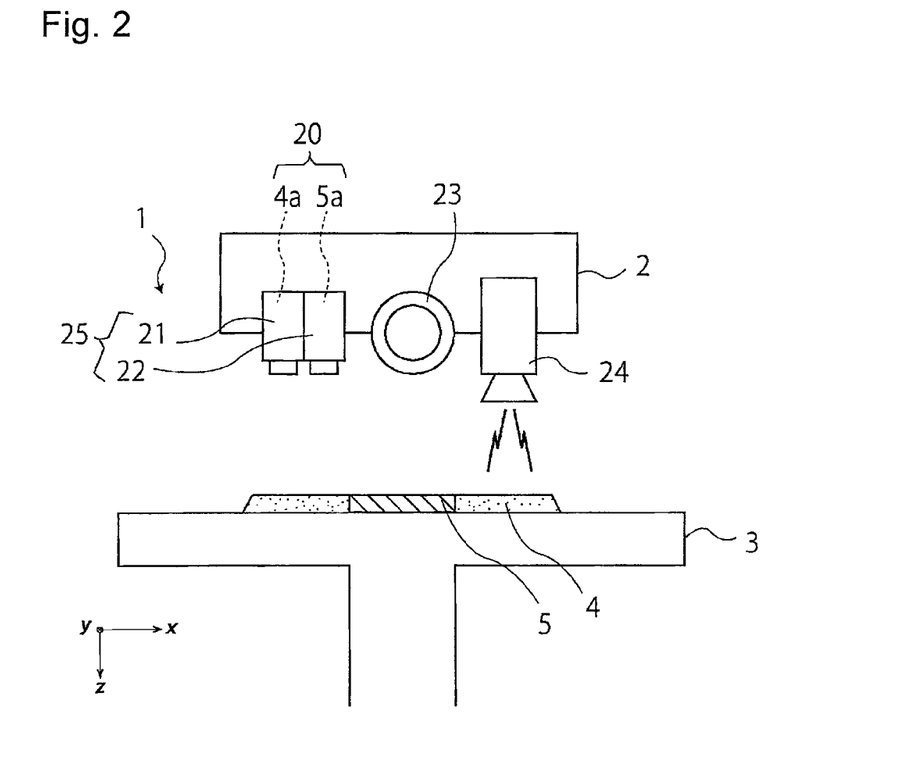
FIG. 2 is a view schematically showing a step (II) in the method for manufacturing a light cured article of the present embodiment.

FIG. 2 is a view schematically showing a step (II) in the method for manufacturing a light cured article of the present embodiment. As shown in FIG. 2, by irradiating light to the resin composition layer which has been formed by a step (I), using the light source 24, a cured layer composed of a modeling material 4 and a supporting material 5 is formed.

Figure 3:
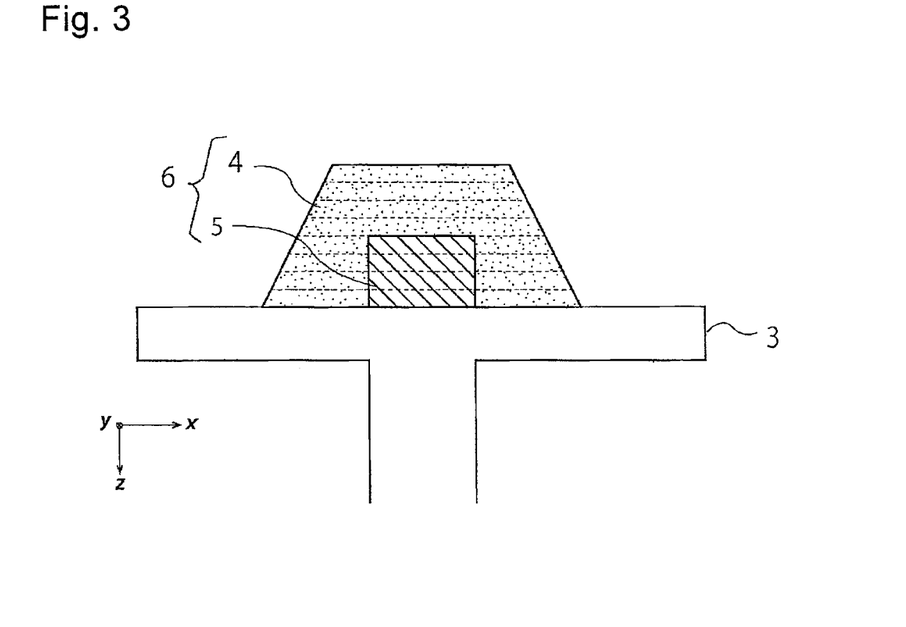
FIG. 3 is a view schematically showing a cured product 6 composed of a modeling material 4 and a supporting material 5, which was obtained by repeatedly performing steps (I) and (II) in the method for manufacturing a light cured article of the present embodiment.

Then, the shaping table 3 is lowered in a Z direction in FIG. 1 by a thickness of the cured layer. Thereafter, by the same methods as those of the steps (I) and (II), on the cured layer, a cured layer composed of a modeling material 4 and a supporting material 5 is further formed. By performing these steps repeatedly, a cured product 6 composed of the modeling material 4 and the supporting material 5 is made. FIG. 3 is a view schematically showing a cured product 6 composed of a modeling material 4 and a supporting material 5, which has been obtained by repeatedly performing steps (I) and (II) in the method for manufacturing a light cured article of the present embodiment.

Examples of light which cures the resin composition include, for example, far infrared rays, infrared rays, visible rays, near ultraviolet rays, ultraviolet rays and the like. Among them, from a view point of easiness and the efficiency of curing work, near ultraviolet rays or ultraviolet rays are preferable.

Examples of the light source 24 include a mercury lamp, a metal halide lamp, an ultraviolet LED, an ultraviolet laser and the like. Among them, from a view point of miniaturization of facilities and electric power saving, the light source 24 is preferably an ultraviolet LED. In addition, when the ultraviolet LED is used as the light source 24, the integrated light quantity of ultraviolet rays is preferably around 500 mJ/cm$^2$.

<Step (III)>

Figure 4:
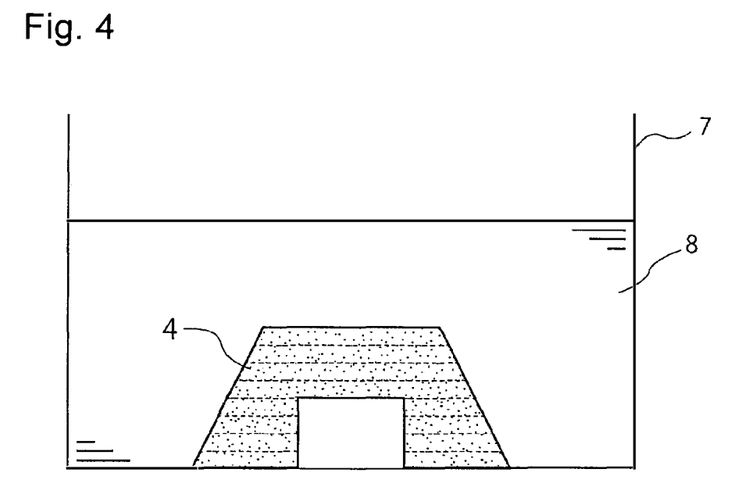
FIG. 4 is a view schematically showing a step (III) in the method for manufacturing a light cured article of the present embodiment.

FIG. 4 is a view schematically showing a step (III) in the method for manufacturing a light cured article of the present embodiment. As shown in FIG. 4, the cured product 6 composed of the modeling material 4 and the supporting material 5, which has been made in a step (III), is immersed in a solvent 8 contained in a container 7. Thereby, the supporting material 5 can be removed by dissolving it in the solvent 8.

Examples of the solvent 8 which dissolves the supporting material 5 include, for example, ion-exchanged water, distilled water, tap water, well water and the like. Among them, from a view point of relatively few impurities and availability at a low price, the solvent 8 is preferably ion-exchanged water.

By the forgoing steps, a light cured article having the good dimensional accuracy can be obtained using the resin composition for a modeling material and the light curing molding ink set of the present embodiment.

Examples which disclose the present embodiment more specifically will be shown below. In addition, the present invention is not limited to only these Examples.

EXAMPLES

[Assessment of Relevancy between Dimensional Accuracy and Bleeding]
<Method of Assessing Dimensional Accuracy>

Figure 5A:
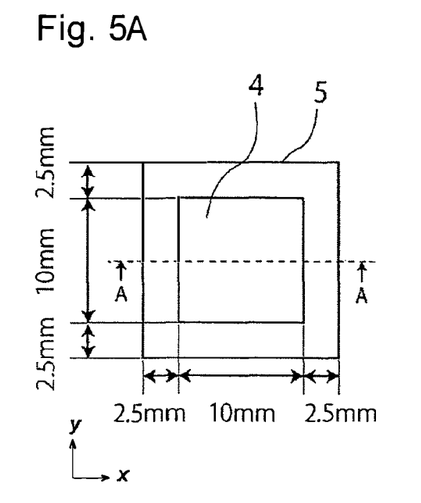
FIG. 5A is a top view of a cured product which is obtained using each resin composition for a modeling material and each resin composition for a supporting material shown in Table 1.
Figure 5B:
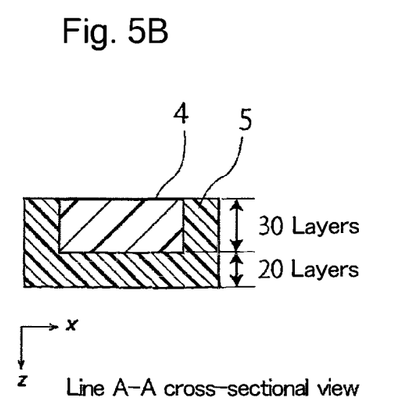
FIG. 5B is a line A-A cross-sectional view of FIG. 5A.

Using each resin composition for a modeling material and each resin composition for a supporting material of test Nos. A1 to A4 shown in Table 1, a cured product was made. A shape and a target dimension of the cured product are shown in FIGS. 5A and 5B. In addition, a step of discharging each resin composition for a modeling material and each resin composition for a supporting material from an ink-jet head was performed so that the resolution became 600×600 dpi, and a thickness of one resin composition layer became 48 μm. Additionally, a step of photocuring each resin composition for a modeling material and each resin composition for a supporting material, respectively, was performed using a LED light source of a wavelength 385 nm, which had been installed on a rear side of an ink-jet head in a scanning direction, under the conditions of the illuminance of 580 mW/cm$^2$, and the integrated light quantity per one resin composition layer of 600 mJ/cm$^2$. Then, by immersing the cured product in ion-exchanged water, the supporting material was removed to obtain a light cured article. Thereafter, the resulting light cured article was allowed to stand in a desiccator for 24 hours, and was sufficiently dried. By the above-mentioned step, each five of light cured articles of test Nos. A1 to A4 were manufactured. Concerning the light cured articles after drying, dimensions in an x direction and a y direction in FIG. 5A were measured using a slide caliper, and a change rate from the target dimension was calculated. For the dimensional accuracy, an average of a dimensional change rate in respective light cured articles of test Nos. A1 to A4 was obtained, and assessment was performed using the average based on the following criteria. The assessment results are shown in Table 1.

○: An average dimensional change rate is less than ±1.0%.

x: An average dimensional change rate is ±1.0% or more.
<Method of Assessing Bleeding>

First, each 0.02 mL of each resin composition for a modeling material and each resin composition for a supporting material shown in Table 1 were added dropwise on a film composed of polyethylene terephthalate (A4300, manufactured by TOYOBO CO., LTD., 100 mm×150 mm×thickness 188 μm) using a micropipette. Thereupon, in the resin composition for a modeling material and the resin composition for a supporting material, a distance between central parts of respective liquid droplets was 10 mm, and respective liquid droplets were independent. Thereafter, respective liquid droplets were gradually wettedly spread, and respective liquid droplets were unified after about 10 seconds. Thereupon, the state of an interface of respective liquid droplets was observed visually from an upper side, and bleeding was assessed based on the following criteria. The assessment results are shown in Table 1.

○: An interface between a layer composed of a resin composition for a modeling material and a layer composed of a resin composition for a supporting material became linear when viewed from the top, and bleeding was not generated.

Δ: At an interface between a layer composed of a resin composition for a modeling material and a layer composed of a resin composition for a supporting material, slight bleeding was generated.

x: At an interface between a layer composed of a resin composition for a modeling material and a layer composed of a resin composition for a supporting material, bleeding was generated.

TABLE 1

| Test No. | Resin composition for modeling material | Resin composition for supporting material | Dimensional accuracy x direction | Dimensional accuracy y direction | Bleeding assessment |
|---|---|---|---|---|---|
| A1 | MTD-23 | STD-9 | x | x | x |
| A2 | | STD-11 | ○ | ○ | ○ |
| A3 | MTD-25 | STD-9 | x | x | x |
| A4 | | STD-11 | ○ | ○ | ○ |

As seen from the results of Table 1, in the light cured articles of test Nos. A2 and A4, which had the good dimensional accuracy, an interface between the layer composed of the resin composition for a modeling material and the layer composed of the resin composition for a supporting material became linear, and bleeding was not generated. On the other hand, in the light cured articles of test Nos. A1 and A3, the dimensional accuracy of which had reduced, by movement of the resin composition for a modeling material to a side of the resin composition for a supporting material, at an interface between the layer composed of the resin composition for a modeling material and the layer composed of the resin composition for a supporting material, bleeding was generated. In this way, bleeding which is generated at an interface between the layer composed of the resin composition for a modeling material and the layer composed of the resin composition for a supporting material is one of the causes for reduction in the dimensional accuracy of the light cured article. Then, bleeding which is generated at an interface between the layer composed of the resin composition for a modeling material and the layer composed of the resin composition for a supporting material was assessed below.

[Assessment of Bleeding]
<Adjustment of Resin Composition>
(Preparation of Resin Composition for Model Material)

According to formulation shown in Table 2, (A) to (D) components, and other additives were uniformly mixed using a mixing and stirring device, and resin compositions for a modeling material of M1 to M23 were manufactured.

TABLE 2

| Resin composition for modeling material | | | | Surface tension (mN/m) | M1 | M2 | M3 | M4 | M5 | M6 | M7 | M8 |
|---|---|---|---|---|---|---|---|---|---|---|---|---|
| Formulation (part by weight) | (A) | Monofunctional ethylenic unsaturated monomer | BCHA | 28.5 | — | — | — | — | — | — | — | 68.8 |
| | | | TMCHA | 27.3 | 68.8 | 58.8 | 48.8 | 38.8 | 28.8 | 18.8 | 8.8 | — |
| | | | ACMO | 44.6 | — | — | — | — | — | — | — | — |
| | | | PEA | 39.2 | — | 10.0 | 20.0 | 30.0 | 40.0 | 50.0 | 60.0 | — |
| | | Polyfunctional ethylenic unsaturated monomer | DEGDA | 38.2 | — | — | — | — | — | — | — | — |
| | | | A-NPA | 32.0 | — | — | — | — | — | — | — | — |
| | | | Ebe150 | 38.6 | — | — | — | — | — | — | — | 25 |
| | (B) | Photopolymerization initiator | DAROCURE TPO | — | 5 | 5 | 5 | 5 | 5 | 5 | 5 | 5 |
| | | | IRGACURE907 | — | — | — | — | — | — | — | — | — |
| | | | Chivacure ITX | — | — | — | — | — | — | — | — | — |
| | (C) | Surface adjusting agent | BYK-UV3500 | — | — | 0.01 | 0.01 | 0.01 | 0.01 | 0.01 | 0.01 | 0.01 |
| | (D) | Oligomer | CN996 | 39.6 | 25 | 25 | 25 | 25 | 25 | 25 | 25 | — |
| Other additives | | Coloring agent | MA-8 | — | — | — | — | — | — | — | — | — |
| | | | Yellow G01 | — | — | — | — | — | — | — | — | — |
| | | | RT355D | — | — | — | — | — | — | — | — | — |
| | | | BT-617-D | — | — | — | — | — | — | — | — | — |
| | | | CR-60 | — | — | 1.00 | 1.00 | 1.00 | 1.00 | 1.00 | 1.00 | 1.00 |
| | | Pigment diapersant | Sol.32000 | — | 0.20 | 0.20 | 0.20 | 0.20 | 0.20 | 0.20 | 0.20 | 0.20 |
| Surface tension (mN/m) | | | Mt | | 25.2* | 25.7* | 26.6 | 28.1 | 29.4 | 30.6 | 32.5 | 25.0* |
| | | | Mst | | 30.6* | 31.8* | 33.1 | 34.4 | 35.7 | 36.9 | 38.2 | 31.2* |
| Discharge stability | | | Nozzle slip-out | | Δ | Δ | ○ | ○ | ○ | ○ | ○ | Δ |
| | | | Ligament length | | ○ | ○ | ○ | ○ | ○ | ○ | ○ | ○ |

| Resin composition for modeling material | | | | Surface tension (mN/m) | M9 | M10 | M11 | M12 | M13 | M14 | M15 | M16 |
|---|---|---|---|---|---|---|---|---|---|---|---|---|
| Formulation (part by weight) | (A) | Monofunctional ethylenic unsaturated monomer | BCHA | 28.5 | 58.8 | 48.8 | 38.8 | 28.8 | 18.8 | 8.8 | — | — |
| | | | TMCHA | 27.3 | — | — | — | — | — | — | — | — |
| | | | ACMO | 44.6 | — | — | — | — | — | — | 38.8 | — |
| | | | PEA | 39.2 | — | — | — | — | — | — | — | 38.8 |
| | | Polyfunctional ethylenic unsaturated monomer | DEGDA | 38.2 | 10 | 20 | 30 | 40 | 50 | 60 | 30 | — |
| | | | A-NPA | 32.0 | — | — | — | — | — | — | — | 30 |
| | | | Ebe150 | 38.6 | 25 | 25 | 25 | 25 | 25 | 25 | 25 | 25 |
| | (B) | Photopolymerization initiator | DAROCURE TPO | — | 5 | 5 | 5 | 5 | 5 | 5 | 5 | — |
| | | | IRGACURE907 | — | — | — | — | — | — | — | — | 45 |
| | | | Chivacure ITX | — | — | — | — | — | — | — | — | 0.5 |
| | (C) | Surface adjusting agent | BYK-UV3500 | — | — | 0.01 | 0.01 | 0.01 | 0.01 | 0.01 | 0.01 | 0.01 |
| | (D) | Oligomer | CN996 | 39.6 | — | — | — | — | — | — | — | — |
| Other additives | | Coloring agent | MA-8 | — | — | — | — | — | — | — | — | — |
| | | | Yellow G01 | — | — | — | — | — | — | — | — | — |
| | | | RT355D | — | — | — | — | — | — | — | — | — |
| | | | BT-617-D | — | — | — | — | — | — | — | — | — |
| | | | CR-60 | — | — | 1.00 | 1.00 | 1.00 | 1.00 | 1.00 | 1.00 | 1.00 |
| | | Pigment diapersant | Sol.32000 | — | 0.20 | 0.20 | 0.20 | 0.20 | 0.20 | 0.20 | 0.20 | 0.20 |
| Surface tension (mN/m) | | | Mt | | 25.2* | 25.6* | 26.2 | 27.9 | 29.5 | 31.8 | 32.1 | 29.4 |
| | | | Mst | | 32.2* | 33.3 | 34.3 | 35.3 | 36.4 | 37.4 | 38.4 | 36.7 |
| Discharge stability | | | Nozzle slip-out | | Δ | Δ | ○ | ○ | ○ | ○ | ○ | ○ |
| | | | Ligament length | | ○ | ○ | ○ | ○ | ○ | ○ | ○ | ○ |

| Resin composition for modeling material | | | | Surface tension (mN/m) | M17 | M18 | M19 | M20 | M21 | M22 | M23 |
|---|---|---|---|---|---|---|---|---|---|---|---|
| Formulation (part by weight) | (A) | Monofunctional ethylenic unsaturated monomer | BCHA | 28.5 | — | — | — | — | — | — | — |
| | | | TMCHA | 27.3 | 39.2 | 39.2 | 39.2 | 39.2 | 40.0 | 28.8 | 28.8 |
| | | | ACMO | 44.6 | — | — | — | — | — | — | — |
| | | | PEA | 39.2 | 30.0 | 30.0 | 30.0 | 30.0 | 30.0 | 40.0 | 40.0 |
| | | Polyfunctional ethylenic unsaturated monomer | DEGDA | 38.2 | — | — | — | — | — | — | — |
| | | | A-NPA | 32.0 | — | — | — | — | — | — | — |
| | | | Ebe150 | 38.6 | — | — | — | — | — | — | — |
| | (B) | Photopolymerization initiator | DAROCURE TPO | — | 5 | 5 | 5 | 5 | 5 | 5 | 5 |
| | | | IRGACURE907 | — | — | — | — | — | — | — | — |
| | | | Chivacure ITX | — | — | — | — | — | — | — | — |

TABLE 2-continued

| | | | | | | | | | | |
|---|---|---|---|---|---|---|---|---|---|---|
| (C) | Surface adjusting agent | BYK-UV3500 | — | 0.01 | 0.01 | 0.01 | 0.01 | 0.01 | — | 0 |
| (D) | Oligomer | CN996 | 39.6 | 25 | 25 | 25 | 25 | 25 | 25 | 25 |
| Other additives | Coloring agent | MA-8 | — | 0.50 | — | — | — | — | — | — |
| | | Yellow G01 | — | — | 050 | — | — | — | — | — |
| | | RT355D | — | — | — | 0.50 | — | — | — | — |
| | | BT-617-D | — | — | — | — | 0.50 | — | — | — |
| | | CR-60 | — | — | — | — | — | — | 1.00 | 1.00 |
| | Pigment diapersant | Sol.32000 | — | 0.25 | 0.25 | 0.25 | 0.25 | — | 0.20 | 0.20 |
| Surface tension (mN/m) | | Mt | | 27.8 | 28.4 | 27.9 | 27.6 | 28.4 | 36.1* | 23.8* |
| | | Mst | | 34.4 | 34.4 | 34.4 | 34.4 | 34.3 | 36.3 | 36.3 |
| Discharge stability | | Nozzle slip-out | | ○ | ○ | ○ | ○ | ○ | ○ | x |
| | | Ligament length | | ○ | ○ | ○ | ○ | ○ | x | ○ |

*means outside a range defined in claim 1.
BCHA: 4-t-Butylcyclohexanol acrylate [SR217 (ethylenic double bond/one molecule: one), manufactured by Arkema S.A.]
TMCHA: 3,3,5-Trimethylcyclohexanol acrylate [SR420 (ethylenic double bond/one molecule: one), manufactured by Arkema S.A.]
ACMO: Acryloylmorpholine [ACMO (ethylenic double bond/one molecule: one), manufactured by KJ Chemicals Corporation]
PEA: Phenoxyethyl acrylate [SR339 (ethylenic double bond/one molecule: one), manufactured by Arkema S.A.]
DEGDA: Diethylene glycol diacrylate [SR230 (ethylenic double bond/one molecule: 2), manufactured by Arkema S.A.]
A-NPA: Alkoxylated neopentyl glycol diacrylate [SR9003 (ethylenic double bond/one molecule: 2), manufactured by Arkema S.A.]
Ebe150: Modified bisphenol A diacrylate [Ebacryl150 (ethylenic double bond/one molecule: 2), manufactured by DAICEL-ALLNEX LTD.]
DAROCURE TPO: 2,4,6-Trimethylbenzoyl-diphenyl-phosphine oxide [DAROCURE TPO, manufactured by BASF company]
IRGACURE907: 2-Methyl-1-[4-(methylthio)phenyl]-2-morpholinopropane-1-one [IRGACURE 907, manufactured by Ciba company]
Chivacure ITX: 2-Isopropylthioxanthone [Chivacure ITX, manufactured by Double Bond Chemical Co., Ltd.]
BYK-UV3500: Silicone-based compound having a polydimethylsiloxane structure [BYK-UV3500, manufactured by BYK-Chemie company]
CN996: Urethane acrylate oligomer [CN996 (ethylenic double bond/one molecule: 2), manufactured by Arkema S.A.]
MA-8: Acidic carbon black pigment [MA-8, manufactured by Mitsubishi Chemical Corporation]
Yellow G01: Nickel azo pigment [Yellow G01, manufactured by Levascreen company]
RT355D: Quinacridone pigment [CINQUASIA Magenda RT-355-D, manufactured by Ciba company]
BT-617-D: Copper phthalocyanine pigment [HOSTAPERM BLUE BT-617-D, manufactured by Clariant company]
CR-60: Titanium oxide [CR-60, manufactured by ISHIHARA SANGYO KAISHA, LTD.]
Sol. 32000: Comb-type copolymer having a basic functional group [Solsperse 32000, manufactured by Avecia company]

(Preparation of Resin Composition for Support Material)

According to formulation shown in Table 3, (B), (C), (E), and (F) components, and a water-soluble organic solvent were uniformly mixed using a mixing and stirring device, and resin compositions for a supporting material of S1 to S6 were manufactured.

for a supporting material shown in Table 3, a value after 20 seconds from measurement initiation, at 25° C. was measured using Full Automatic Equilibrium Electro Surface Tension Meter ESB-V (manufactured by Kyowa Interface Science Co., Ltd.). The measurement results are shown in Table 2 and Table 3.

TABLE 3

| Resin composition for supporting material | | | | S1 | S2 | S3 | S4 | S5 | S6 |
|---|---|---|---|---|---|---|---|---|---|
| Formulation (part by weight) | (E) | Water-soluble monofunctional ethylenic unsaturated monomer | ACMO | 50.0 | 49.9 | 49.7 | 29.2 | 49.5 | 49.0 |
| | (F) | Polyalkylene glycol comprising oxyethylene group and/or oxypropylene group | PPG-1000 | 45.0 | 45.0 | 45.0 | 30.0 | 45.0 | 45.0 |
| | (B) | Photopolymerization initiator | DAROCURE TPO | 5.0 | 5.0 | 5.0 | 5.0 | 5.0 | 5.0 |
| | | | IRGACURE907 | — | — | — | 5.0 | — | — |
| | | | Chivacure ITX | — | — | — | 0.5 | — | — |
| | (C) | Surface adjusting agent | BYK-307 | — | 0.1 | 0.3 | 0.3 | 0.5 | 1.0 |
| | Other additives | Water-soluble organic solvent | MTG | — | — | — | 30.0 | — | — |
| Surface tension (mN/m) | | | St | 40.1** | 35.2** | 32.7 | 32.2 | 25.1 | 23.4** |
| Discharge stability | | | Nozzle slip-out | ○ | ○ | ○ | ○ | ○ | x |
| | | | Ligament length | x | Δ | ○ | ○ | ○ | ○ |

**means outside a range defined in claim 6.
ACMO: Acryloylmorpholine [ACMO (ethylenic double bond/one molecule: one), manufactured by KJ Chemicals Corporation]
PPG-1000: Polypropylene glycol [UNIOL D1000 (molecular weight 1000), manufactured by NOF CORPORATION]
DAROCURE TPO: 2,4,6-Trimethylbenzoyl-diphenyl-phosphine oxide [DEROCURE TPO, manufactured by BASF company]
IRGACURE907:2-Methyl-1-[4-(methylthio)phenyl]-2-morpholinopropane-1-one [IRGACURE 907, manufactured by Ciba company]
Chivacure ITX: Isopropylthioxanthone [Chivacure ITX, manufactured by Double Bond Chemical Ind., Co., Ltd.]
BYK-307: Silicone-based compound having a polydimethylcyclohexane structure [BYK-307, manufactured by BYK-Chemie company]
MTG: Triethylene glycol monomethyl ether [MPG, manufactured by NIPPON NYUKAZAI CO, LTD.]

<Method of Measuring Surface Tension>

As the surface tension of each resin composition for a modeling material of M1 to M23 and each photocuring component contained in the resin composition for a modeling material shown in Table 2, as well as each resin composition for a supporting material of S1 to S6 and each photocuring component contained in the resin composition <Method of Assessing Discharge Stability>

Discharge stability of each composition for a modeling material of M1 to M23 shown in Table 2 and each resin composition for a supporting material of S1 to S6 shown in Table 3 was assessed by calculating the ratio of generation of nozzle slip-out, and the ligament length.

(Ratio of Generation of Nozzle Slip-Out)

By performing continuous discharge under the conditions of a nozzle diameter: 20 μm, a flying speed: 7 m/sec, a discharge frequency: 10 kHz, and a continuous discharge time: 5 min, a nozzle check pattern was printed, and the number of nozzles in which nozzle slip-out was generated was counted. And, the ratio of generation of nozzle slip-out was assessed based on the following criteria. The assessment results are shown in Table 2 and Table 3. In addition, nozzle slip-out refers to the state where an ink is not discharged due to clogging of a nozzle.

○: Nozzle slip-out 0%
Δ: Nozzle slip-out more than 0% to less than 5%
x: Nozzle slip-out 5% or more (Ligament Length)

Discharge was performed under the conditions of a nozzle diameter: 20 μm, a flying speed: 7 m/sec. and a discharge frequency: 1 kHz, the time from passing of the head of liquid droplets until passing of the tail end of liquid droplets was measured at a position of 1 mm distance from the nozzle, and thereafter, the ligament length was calculated by integrating the time and the flying speed. And, the ligament length was assessed based on the following criteria. The assessment results are shown in Table 2 and Table 3. In addition, the ligament length refers to the length of a liquid droplet which is discharged from a nozzle. When the ligament length is great, ink mist becomes easy to be generated.

○: Ligament length less than 300 μm
Δ: Ligament length 300 to 500 μm
x: Ligament length more than 500 μm In addition, in the present description, the resin composition in which assessment of the ratio of generation of nozzle slip-out was ○, and assessment of the ligament length was ○ was determined to be excellent in discharge stability. Additionally, the resin composition having another assessment was determined to be inferior in discharge stability.

As seen from Table 2, resin compositions for a modeling material of M3 to M7, and M11 to M21 in which the surface tension Mt is 26.0 to 33.0 mN/m are excellent in discharge stability. Additionally, as seen from Table 3, resin compositions for a supporting material of S3 to S5 in which the surface tension St is 24.0 to 33.0 mN/m are excellent in discharge stability.

<Method of Assessing Bleeding>

Using each resin composition for a modeling material of M1 to M21 shown in Table 2 and each resin composition for a supporting material of S3 and S4 shown in Table 3, bleeding was assessed by the same method as that described above. The assessment results are shown in Table 4 and Table 5.

TABLE 4

| Test No. | Resin composition for modeling material | Resin composition for supporting material | Bleeding assessment |
| --- | --- | --- | --- |
| 1 | M1* | S3 | x |
| 2 | M2* |  | x |
| 3 | M3 |  | ○ |
| 4 | M4 |  | ○ |
| 5 | M5 |  | ○ |
| 6 | M6 |  | ○ |
| 7 | M7 |  | ○ |
| 8 | M8* |  | x |
| 9 | M9* |  | x |
| 10 | M10* |  | Δ |
| 11 | M11 |  | ○ |
| 12 | M12 |  | ○ |

TABLE 4-continued

| Test No. | Resin composition for modeling material | Resin composition for supporting material | Bleeding assessment |
| --- | --- | --- | --- |
| 13 | M13 |  | ○ |
| 14 | M14 |  | ○ |
| 15 | M15 |  | ○ |
| 16 | M16 |  | ○ |
| 17 | M1* | S4 | x |
| 18 | M2* |  | x |
| 19 | M3 |  | ○ |
| 20 | M4 |  | ○ |
| 21 | M5 |  | ○ |
| 22 | M6 |  | ○ |
| 23 | M7 |  | ○ |
| 24 | M8* |  | x |
| 25 | M9* |  | x |
| 26 | M10* |  | Δ |
| 27 | M11 |  | ○ |
| 28 | M12 |  | ○ |
| 29 | M13 |  | ○ |
| 30 | M14 |  | ○ |
| 31 | M15 |  | ○ |
| 32 | M16 |  | ○ |

*means outside a range defined in claim 1.

TABLE 5

| Test No. | Resin composition for modeling material | Resin composition for supporting material | Bleeding assessment |
| --- | --- | --- | --- |
| 33 | M17 | S3 | ○ |
| 34 |  | S4 | ○ |
| 35 | M18 | S3 | ○ |
| 36 |  | S4 | ○ |
| 37 | M19 | S3 | ○ |
| 38 |  | S4 | ○ |
| 39 | M20 | S3 | ○ |
| 40 |  | S4 | ○ |
| 41 | M4 | S3 | ○ |
| 42 |  | S4 | ○ |
| 43 | M21 | S3 | ○ |
| 44 |  | S4 | ○ |

As seen from the results of Table 4, in the resin compositions for a modeling material and the resin compositions for a supporting material of test Nos. 3 to 7, 11 to 16, 19 to 23, and 27 to 32 satisfying all requirements of the present invention, an interface between the layer composed of the resin composition for a modeling material and the layer composed of the resin composition for a supporting material became linier when viewed from the top, and bleeding was not generated.

On the other hand, in the resin compositions for a modeling material and the resin compositions for a supporting material of test Nos. 1, 2, 8, 9, 17, 18, 24 and 25, in which the surface tension Mt and the surface tension Mst represented by the (i) expression do not satisfy the requirements of the present invention, at an interface between the layer composed of the resin composition for a modeling material and the layer composed of the resin composition for a supporting material, blur was generated.

Additionally, in the resin compositions for a modeling material and the resin compositions for a supporting material of test Nos. 10 and 26, the surface tension Mt of which does not satisfy the requirement of the present invention, at an interface between the layer composed of the resin composition for a modeling material and the layer composed of the resin composition for a supporting material, slight blur was generated.

As seen from the results of Table 5, in the resin compositions for a modeling material and the resin compositions for a supporting material of test Nos. 33 to 44 satisfying all requirements of the present invention, an interface between the layer composed of the resin composition for a modeling material and the layer composed of the resin composition for a supporting material became linier, and bleeding was not generated. That is, in the resin compositions for a modeling material and the resin compositions for a supporting material satisfying all requirements of the present invention, even when the coloring agent is not contained, or a kind of the coloring agent was changed, bleeding is not generated.

As shown in Table 1, when bleeding is not generated at an interface between the layer composed of the resin composition for a modeling material and the layer composed of the resin composition for a supporting material, a light cured article having the good dimensional accuracy is obtained. On the other hand, when bleeding is generated at an interface between the layer composed of the resin composition for a modeling material and the layer composed of the resin composition for a supporting material, the dimensional accuracy of a light cured article is reduced. Accordingly, since in the resin compositions for a modeling material and the resin compositions for a supporting material of test Nos. 3 to 7, 11 to 16, 19 to 23, 27 to 32, and 33 to 44 satisfying all requirements of the present invention, at an interface between the layer composed of the resin composition for a modeling material and the layer composed of the resin composition for a supporting material, bleeding was not generated, a light cured article having the good dimensional accuracy is obtained. On the other hand, since in the resin compositions for a modeling material and the resin compositions for a supporting material of test Nos. 1, 2, 8, 9, 10, 17, 18, and 24 to 26 not satisfying the requirements of the present invention, at an interface between the layer composed of the resin composition for a modeling material and the layer composed of the resin composition for a supporting material, bleeding was generated, the dimensional accuracy of a light cured article is reduced.

Other Embodiments

The method for manufacturing a light cured article of the above-mentioned embodiment may further comprise a step of discharging only a resin composition for a modeling material from an ink-jet head so that only a layer composed of the resin composition for a modeling material is formed, thereafter, photocuring the resin composition for a modeling material constituting the layer, thereby, obtaining a modeling material and/or a step of discharging only a resin composition for a supporting material from an ink-jet head so that only a layer composed of the resin composition for a supporting material is formed, thereafter, photocuring the resin composition for a supporting material constituting the layer, thereby, obtaining a supporting material.

INDUSTRIAL APPLICABILITY

The resin composition for a modeling material, and the light curing molding ink set comprising the resin composition for a modeling material of the present invention can afford a light cured article having the good dimensional accuracy. Hence, the resin composition for a modeling material and the light curing molding ink set of the present invention can be suitably used in manufacturing a light cured article by a manufacturing method for light curing molding using an ink-jet scheme.

The invention claimed is:

1. A light curing molding ink set used for a manufacturing method for light curing molding using an ink-jet scheme, comprising a combination of a resin composition for a modeling material used for shaping the modeling material, and a resin composition for a supporting material used for shaping the supporting material, wherein the resin composition for modeling material contains (A) an ethylenic unsaturated monomer as a photocuring component, (B) a photopolymerization initiator, (C) a surface adjusting agent, and (D) an oligomer as a photocuring component, wherein the resin composition for a modeling material has surface tension Mt of 26.0 to 33.0 mN/m, and the resin composition for a modeling material has surface tension Mst represented by the following (i) expression of 33.0 mN/m or more,

[Mathematic 1]

$$Mst = \frac{\Sigma \text{ (Surface tension of each photocuring component} \times \text{content of each photocuring component)}}{\text{Total content of photocuring components}} \quad (i)$$

and wherein the resin composition for a supporting material contains (E) a water-soluble monofunctional ethylenic unsaturated monomer, (F) polyalkylene glycol comprising an oxyethylene group and/or an oxypropylene group, (B) a photopolymerization initiator, and (C) a surface adjusting agent, wherein the resin composition for modeling material in an uncured state and the resin composition for supporting material in an uncured state are directly in contact with each other.

2. The ink set according to claim 1, wherein the (A) component comprises 70 parts by weight or less of a monofunctional ethylenic unsaturated monomer, based on 100 parts by weight of the whole resin composition for a modeling material.

3. The ink set according to claim 2, wherein the content of the monofunctional ethylenic unsaturated monomer is 5 to 70 parts by weight, based on 100 parts by weight of the whole resin composition for a modeling material.

4. The ink set according to claim 1, wherein the (A) component comprises 70 parts by weight or less of a polyfunctional ethylenic unsaturated monomer, based on 100 parts by weight of the whole resin composition for a modeling material.

5. The ink set according to claim 2, wherein the (A) component comprises 70 parts by weight or less of a polyfunctional ethylenic unsaturated monomer, based on 100 parts by weight of the whole resin composition for a modeling material.

6. The ink set according to claim 3, wherein the (A) component comprises 70 parts by weight or less of a polyfunctional ethylenic unsaturated monomer, based on 100 parts by weight of the whole resin composition for a modeling material.

7. The ink set according to claim 4, wherein the content of the polyfunctional ethylenic unsaturated monomer is 20 to 70 parts by weight, based on 100 parts by weight of the whole resin composition for a modeling material.

8. The ink set according to claim 5, wherein the content of the polyfunctional ethylenic unsaturated monomer is 20 to 70 parts by weight, based on 100 parts by weight of the whole resin composition for a modeling material.

9. The ink set according to claim 6, wherein the content of the polyfunctional ethylenic unsaturated monomer is 20 to 70 parts by weight, based on 100 parts by weight of the whole resin composition for a modeling material.

10. The ink set according to claim 1, wherein the content of the (A) component is 80 to 99 parts by weight, based on 100 parts by weight of the whole resin composition for a modeling material.

11. The ink set according to claim 2, wherein the content of the (A) component is 80 to 99 parts by weight, based on 100 parts by weight of the whole resin composition for a modeling material.

12. The ink set according to claim 3, wherein the content of the (A) component is 80 to 99 parts by weight, based on 100 parts by weight of the whole resin composition for a modeling material.

13. The ink set according to claim 4, wherein the content of the (A) component is 80 to 99 parts by weight, based on 100 parts by weight of the whole resin composition for a modeling material.

14. The ink set according to claim 5, wherein the content of the (A) component is 80 to 99 parts by weight, based on 100 parts by weight of the whole resin composition for a modeling material.

15. The ink set according to claim 6, wherein the content of the (A) component is 80 to 99 parts by weight, based on 100 parts by weight of the whole resin composition for a modeling material.

16. The ink set according to claim 7, wherein the content of the (A) component is 80 to 99 parts by weight, based on 100 parts by weight of the whole resin composition for a modeling material.

17. The ink set according to claim 8, wherein the content of the (A) component is 80 to 99 parts by weight, based on 100 parts by weight of the whole resin composition for a modeling material.

18. The ink set according to claim 9, wherein the content of the (A) component is 80 to 99 parts by weight, based on 100 parts by weight of the whole resin composition for a modeling material.

19. The ink set according to claim 1, wherein the content of the (D) component is 10 to 45 parts by weight, based on 100 parts by weight of the whole resin composition for a modeling material.

20. The ink set according to claim 1, wherein the resin composition for a modeling material has the surface tension Mst of 33.0 to 40.0 mN/m.

* * * * *